Aug. 31, 1965 M. DEPENBROCK ETAL 3,204,168
CURRENT CONVERTER POWER SUPPLY SYSTEM FOR REVERSIBLE MOTOR
Filed June 28, 1961 2 Sheets-Sheet 1
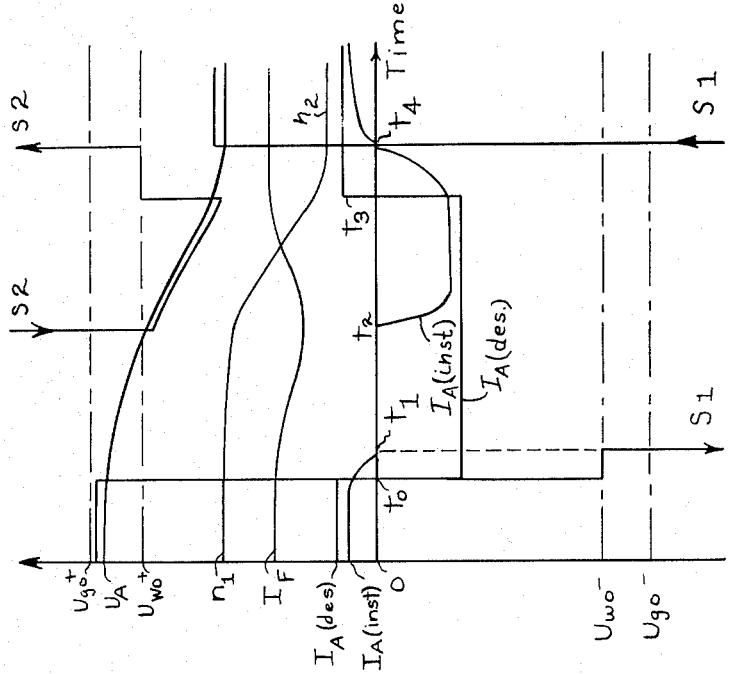
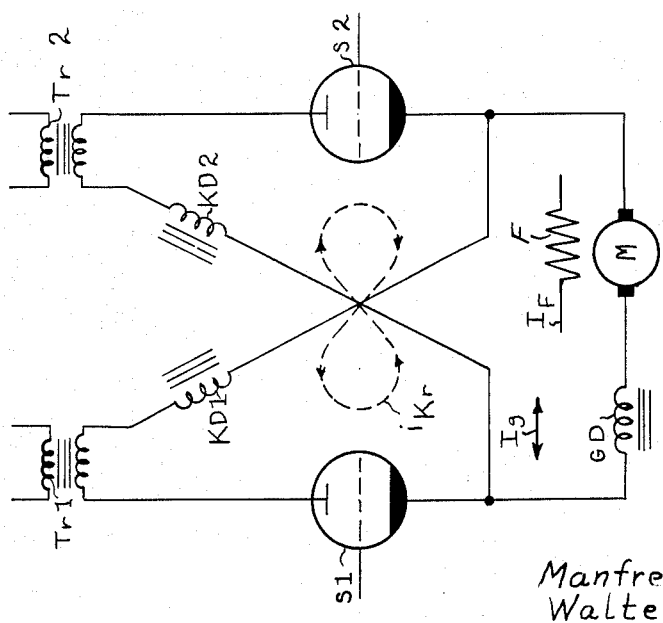
Manfred Depenbrock
Walter Berens
Hans Kielgas
INVENTORS
BY
Pierce Scheffler & Parker
Attorneys Manfred Depenbrock
Walter Berens
Hans Kielgas
INVENTORS United States Patent Office 3,204,168
Patented Aug. 31, 1965

3,204,168
CURRENT CONVERTER POWER SUPPLY
SYSTEM FOR REVERSIBLE MOTOR
Manfred Depenbrock, Mannheim-Almendorf, Walter
Berens, Mannheim-Kafertal, and Hans Kielgas, Mannheim, Germany, assignors, by mesne assignments, to
Aktiengesellschaft Brown, Boveri & Cie, Baden, Switzerland, a joint-stock company of Switzerland
Filed June 28, 1961, Ser. No. 129,930
Claims priority, application Germany, June 29, 1960,
B 58,391
3 Claims. (Cl. 318—261)

This invention relates to an improved apparatus for controlling the operation of current converters connected in load circuits wherein it is desired to reverse the direction of direct current flow, the control being effected in such manner, according to the invention, that the current converters are free from circulating currents.

For supplying direct current to electric drive motors, it is advantageous, in many cases, as is known, to use current converters of the discharge valve type which, with the use of very small control outputs, can be controlled and regulated in a practically inertia-free manner.

With regard for the necessity for such drive motors for changing the speed of rotation of the rotor, or the direction of rotation, it is necessary to reverse the direction of the direct current flowing, for example, through the armature. This is made possible, in a familiar manner, through use of multi-anode current converter vessels, or by use of single-anode current converter vessels in accordance with the so-called counter-parallel connections. These two different types of connections of current converters are included in the following description as "reversible circuits."

The control of the current converters in these reversible circuit arrangements is, in general, so regulated that the medium direct voltage of the current converter serving to supply the current flowing in one direction in the load circuit corresponds nearly with the medium direct voltage of the current converter intended for the current supply in the other direction. In this, the multi-anode vessel, or the single-anode vessels of one current converter are so controlled as to function as a rectifier while those vessels or vessel of the other current converter are so controlled as to function as an inverter, and vice versa. With this type of control, the direct current can run, without noticeable interruption through all positive values down to zero, after passing zero, through all negative values, since both current converters are available at any time for current conduction.

As a result of the different control of the current converters for rectifier and inverter operation, the direct voltages do not correspond, however, in their instantaneous values even with equal medium values. Their harmonics have a different phase position. Consequently, in the case of such a control for rectifier and inverter operation, and equal medium direct voltages, there is developed a so-called circulating current running in impulses.

In the drawings:

FIG. 1 shows a current converter connected in a reversible motor circuit.

FIG. 3 shows voltage curves for typical operating conditions of the motor control circuit.

Figure 2:
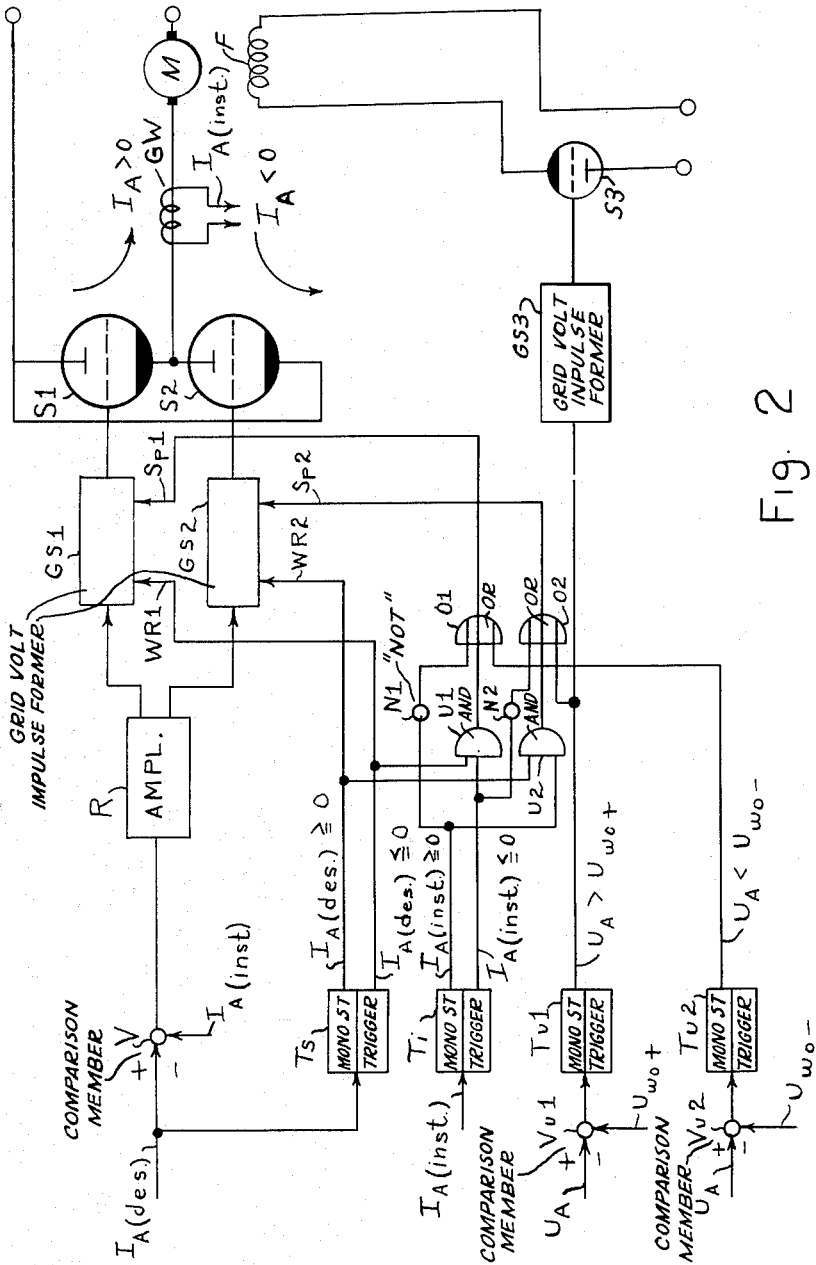
FIG. 2 shows the invention applied to regulation of the direction and flow of armature current for an electro motor drive.

For an explanation of these familiar relationships, reference is made to FIG. 1 of the accompanying drawings which shows a current converter connected in a reversible circuit and in fact, as an example, in a cross-circuit. The current converter vessels S1 and S2, which are in fact multi-anode vessels, are represented as single anode vessels for the sake of simplicity. The power supply to these converters takes place through transformers $Tr1$ and $Tr2$. The current converter vessels S1, S2 are connected with the armature element of motor M, the field winding being represented at F and a choke GD is included in the circuit connections between the converter vessels and armature. As a result of the different voltage harmonics which exist, there is created in the circuit a circulating current $i_{Kr}$ which is limited by so-called circulating current chokes KD1 and KD2 and which are also often designated as commutating chokes. These chokes KD1 and KD2 are connected in cross-circuit between the transformers $Tr1$ and $Tr2$ and the output sides of the converter vessels S1 and S2.

This circulating current causes additional losses and results in an additional reactive power requirement. In addition, the circulating current chokes, whose iron cores are customarily manufactured from comparatively expensive material, cause a not inconsiderable increase in cost of the unit.

In order to achieve a smaller rated power for the circulating current chokes there has been used, particularly with current converters for field excitation of motors, a control method in which, giving up a completely steady transition of the current with reversal of the direction of rotation of the motor rotor, the current converter part which, at the time, is not taking part in the current conduction, is kept at a maximum inverter modulation, and only in case of necessity is operation of the current converter exchanged. After this release process of the power supply of both current converters will the previous current-carrying converter be reversed to maximum inverter modulation.

With this type of control method, the circulating current flowing for a given circulating current choke becomes smaller, indeed, but it cannot be eliminated entirely, especially in the vicinity of the complete modulation of the rectifier.

The first problem solved by this invention is complete suppression of the circuiting current.

Current converters arranged in a reversible circuit and controlled in the known manner described above have, in addition, also the disadvantage that the current converter operating as a rectifier can only be so highly modulated that its medium direct voltage corresponds to the medium direct voltage of the current converter maximally modulated for operation as an inverter, i.e., with preservation of the so-called safety delay. This is the delay which is necessary to obtain sufficient time for deionization of the current converter between rectifier and inverter operations. This means that upon delivery of the direct current $I_g$ to the motor armature, the rectifier direct voltage must become greater than the inverter direct voltage only by the amount of the inner voltage drop of the current converter and transformers. Consequently, the rectifier remains controlled considerably below its full control, whereby the unit is affected with a certain minimum reactive power.

Also, this second problem of avoiding the disadvantage described is solved by the control apparatus according to the invention. The apparatus makes it possible to control the current converter completely in rectifier operation.

According to the invention, the achievement of an operation, free from circulating currents, of current converters arranged in a reversible circuit for feeding consumer loads with counter-voltage takes place through use of a control apparatus in which for operation of the unit with direct current flowing through the consumer load remaining the same in direction and amount, only one (the first) current converter involved in the conductance of current in such direction is caused to carry current while the other (the second) current converter is completely blocked, and that at the beginning of a desired change in direction of the direct current flow through the consumer load, first the grid voltage impulses of the previously current-carrying (the first) current converter are displaced in their phase relationship in the direction of full inverter operation returning current to the line with regard to the safety delay and this converter will be completely blocked at zero value of the direct current, after which the current converter (the second) involved in the new direction of current flow, is caused to carry current.

The blocking of the current converter can take place by means which remove the grid voltage impulses. For the same purpose, in the case of the current converter being considered, also the exciter arc for the current converter vessel, or the appertaining vessel group belonging to this current converter can be extinguished by cutting off the exciter current. In the latter case, the danger of an ignition is avoided.

The principal objective can, according to the invention, take place by means of a control device which; on the one hand, consists of two grid-control devices supplying grid voltage impulses producing bias voltages for controlling the grids, said devices serving for the control of the current converters with three inputs each; where over a first input the phase is adjusted with the grid voltage impulse given off by the grid control sets by means of a regulator supervising the direct current; over a second input the phase of the grid voltage impulses is adjusted to fuel inverter modulation; and over a third input the grid voltage impulses are entirely suppressed and which: on the other hand is constructed of logic type switch elements consisting of mono-stable multivibrators (triggers) which work together in a manner to be further explained according to the improved apparatus. Instead of a removal of the grid voltage impulses, it is possible by means of the switch elements to effect a quenching of the exciter arcs of the current converter vessel, or groups of vessels, in which case the grid control devices for supplying the grid impulse voltages will be required to have only two inputs each.

An example of such a control device, applied to regulation of the direction and flow of armature current for an electro-motor drive, in which the current converters serve to feed the armature of motor M, is illustrated in the schematic circuit diagram depicted in FIG. 2.

With reference now to FIG. 2, as an example of the counter-parallel wiring of the converters for the reversible circuit, the two circuit converter vessels S1 and S2 are arranged to be conductive in alternation. One such converter is arranged to be conductive for positive armature currents $I_A > 0$; the other converter vessel is conductive for negative armature currents $I_A < 0$. The determination of the instantaneous value $I_{inst.}$ of the armature current is obtained by means of transformers GW constructed as direct current transformers. The control of the current converts S1, S2 takes place by means of grid voltage impulses formed by the grid control devices GS1 and GS2. Each of these two grid control devices is provided with three inputs. The first of these inputs is connected with one output each of the regulating amplifier R to which is applied as input a voltage proportional to the regulating deviation of the armature current, i.e. the difference between a desired value for this current and the actual or instantaneous value. This difference is determined by a comparison member V. Across this first input to the grid control units GS1 and GS2 takes place the displacement in phase of the grid voltage impulses through the regulator of the armature current, consisting of the comparison member V and the regulator amplifier R.

At the second inputs WR1 and WR2 respectively of the grid control units GS1 and GS2 there takes place, independently of the influence of regulator amplifier R, a displacement of the phase of the grid voltage impulses into the full inverter modulation of the current converter being considered. By full inverter modulation is understood the maximal possible modulation with regard to the so-called safety delay.

At the third inputs S$p$1 and S$p$2 respectively of the grid control units GS1 and GS2 there takes place also independently of the influence of regulator amplifier R, a removal of the grid voltage impulses, which leads to a complete blocking of the current converter. Instead of a removal of the grid voltages there can be carried out a switching off of the exciter arc for the converter vessel or the group of vessels of the current converter being considered by switching devices not shown.

The signals for these four blocking inputs WR1, WR2, S$p$1 and S$p$2 are formed by a circuit shown in FIG. 2 which is essentially a logic circuit comprising four mono-stable multivibrators T$s$, T$i$, T$u$1 and T$u$2 designated as triggers, two "and" members U1, U2, and two "or" members 01 and 02. The trigger T$s$ serves for supervising the desired value $I_{A(des.)}$ of the armature current and produces, with a positive desired current value, an output which gives a signal at the input WR2. When the desired value of the current is negative, i.e. less than zero, a signal is produced at WR1. When the desired current value is zero, a signal is produced at both WR1 and WR2 from both outputs of T$s$.

The trigger T$i$ serves for supervision of the instantaneous value $I_{A(inst.)}$ of the armature current. With positive values of the instantaneous current a signal appears at one of the two output lines of this trigger. With negative values of the instantaneous current, a signal appears at the other output line of trigger T$i$. When the instantaneous current has a value of zero, signals appear at both output lines.

The trigger T$u$1 gives off a signal as soon as the armature voltage $U_A$ is more positive than the possible positive inverter direct voltage $U_{w0+}$ at full inverter modulation. The comparison between $U_A$ and $U_{w0+}$ is made in a comparator V$u$1.

The trigger T$u$2 gives off a signal as soon as the armature voltage $U_A$ is less than the possible negative inverter direct voltage $U_{w0-}$ at the full inverter modulation. The comparison between $U_A$ and $U_{w0-}$ is made in a comparator V$u$2.

The outputs from these triggers are connected by means of two "and" members U1 and U2, as well as two "or" members 01 and 02 with the four blocking inputs WE1, S$p$1, WR2, S$p$2 of the two grid control units. In one input lead of each of the "or" members is connected in a member which serves to invert the signal. These reversal members known as "not" members are designated by N1 and N2.

By means of these logic circuit elements, a current converter S1 or S2 is brought into the full inverter modulation with regard to the safety delay through displacement of the phase of the grid control impulses by means of the inputs WR1 or WR2, if the desired value of the armature current of the converter under consideration either cannot deliver current or if the desired value of the current is zero.

In addition, the current converter is completely blocked by way of one of the S$p$1 or S$p$2 if the desired value of the armature current is so directed that the current converter being considered cannot furnish the current and, at the same time, the instantaneous value of the armature current has sunk to zero.

Finally, the blocking of the current converter being considered is maintained over one of the inputs S$p$1 or S$p$2 by means of an appertaining "or" member 01 or 02, if either the armature voltage is greater than the possible inverter direct voltage, or has the wrong polarity for inverter operation.

In addition to the foregoing description of the functions in principal, the control apparatus for a typical application will now be explained with respect to the steps involved and a family of curves as shown in FIG. 3 which includes variation in armature current, armature voltage, rotational speed of the motor and the current converter voltage. In this, it proves expedient in certain cases during the control operation to reduce the normally constant exciter current for the motor field F briefly, as is explained in more detail in the following description.

With reference now to FIG. 3, let it be considered, for example, that the motor starting from a rotational speed $n_1$ close to the basic rotational speed and an armature voltage $U_A$ in the vicinity of the maximum rectifier voltage $U_{g0}$ corresponding to the full control is to be braked by a definite amount, so that at the end of the control operation the reduced rotational speed $n_2$ is attained. The related changes in currents, voltages and rotational speed are represented by corresponding curves in FIG. 3.

At the beginning, the motor is running at a constant speed of rotation $n_1$. The corresponding desired value $I_{A(des.)}$ of the armature current $I_a$ is positive and so great that the corresponding instantaneous value $I_{A(inst.)}$ is sufficient for furnishing the load torque. The armature current is furnished by the current converter S1 whose maximum direct voltage $U_{g0}$ lies somewhat above the armature voltage $U_A$. The field current $I_F$ is likewise constant.

The braking process necessary for reducing the rotational speed from $n_1$ to $n_2$ is introduced for the time $t_0$ in that the previous positive desired value $I_{A(des.)}$ of the armature current is reversed to a definite negative desired value. Thereby the current converter S1 previously modulated for operation as a current rectifier is reversed into operation as an inverter to feed power back into the lines for braking the motor by means of the input WR1 of the grid control device GS1, which can be recognized by the change of the previously positive rectifier direct voltage $U_{g0+}$ into the negative inverter direct voltage $U_{g0-}$. The armature current with the instantaneous value $I_{A(inst.)}$ subsides and, at the moment $t_1$ is zero.

At this moment, $t_1$, the current converter S1 is completely blocked across the input Sp1 of the grid control device GS1. Acocrding to this, however, the grid voltage impulses of the current converter S2 do not yet need to be switched in, since the armature voltage $U_A$ is even higher than the maximum inverter voltage $U_{w0+}$.

In order to reduce the armature voltage $U_A$ as rapidly as possible below the amount of the maximum inverter direct voltage $U_{w0}$, it can be caused by a device, that through the trigger T$u$1 (FIG. 2) the field current $I_F$ of the motor is reduced, so that the armature voltage $U_A$ is lowered. Trigger T$u$1 controls a grid impulse voltage former GS3 which in turn controls the bias voltage on a converter S3 through which direct current is supplied to the field winding F of the motor. At the moment $t_2$ this voltage is to have reached the value $U_{w0+}$. If this field weakening is not provided for, then it requires a little longer until the armature voltage sinks under the value $U_{w0+}$.

At the moment $t_2$, the previous blocking of the current converter S2 is removed. Through the regulator amplifier R, in combination with the comparison member V, the direct voltage of the current converter modulated as an inverter is adjusted to a value which lies somewhat under the armature voltage $U_A$.

Thereby the motor again gets the ability to feed armature current into the inverter which leads to a rapid decline in the rotational speed of the motor armature. In equal measure, the field current $I_F$ is again brought back to its original value.

At the moment $t_3$, the desired rotation speed $n_2$ is to have been reached. Then the desired value of the armature current is reversed, which leads to the fact that the current converter S2 is brought into the full inverter modulation by the input WR2 of the grid control device GS2. Through this, the armature current subsides until at the moment $t_4$ it has reached the value zero. At this moment, the current converter S2 is blocked completely by means of the input S$p$2 of the grid control device GS2.

At the same moment $t_4$, current converter S1 is again modulated with grid voltage impulses. Its direct voltage is so adjusted by means of the regulating amplifier R in combination with the comparison member V that it lies somewhat above the armature voltage, so that an armature current begins to flow in the original direction.

Corresponding methods of operation take place with other rotational speed changes, e.g. with a change in the direction of rotation.

The inventive concept is not limited by the typical embodiment which has been illustrated and described, but admits also of many types of variation. If, for example, blocking of the current converter is to take place, not through removal or suppression of the grid voltage impulse, but rather by switching off of the auxiliary exciter, then the signals passed in the example according to FIG. 2 to the inputs S$p$1 and S$p$2 of the accompanying signals of the "or" members 01 and 02 can serve to actuate a switch device which switches on and off the ignition and exciter device of the current converter vessels or vessel groups.

The adjustment of the desired values of the armature current depending upon the intended alterations in the operational state of the motor can take place, for example, by hand or also in a manner familiar in itself through a superposed regulating device, for example, a rotational speed regulator.

Finally, it proves to be possible to simplify the control apparatus if, for example, through special time members for the regulation, precaution is taken that the desired value of the direct current is changed only so rapidly that the instantaneous value of the direct current can follow the desired value at each and every moment. In this case, the second input WR of the grid control devices, over which the adjustment of the phase of the grid voltage impulses to the full inverter modulation takes place, can be omitted. Then there necessarily results only an adjustment of the phase of the grid voltage impulses in the direction of the full inverter modulation, and in fact over the first input, while the complete blocking of the current converter takes place as previously over the former third input S$p$.

We claim:

1. In a converter plant, the combination comprising a pair of converters each having anode, cathode and control grid elements, means reversely connecting the anode-cathode circuits of said converters between an alternating current supply line and a direct current load circuit containing the armature of a reversible motor, one of said converters being normally conductive and acting as a rectifier to supply direct current to the motor armature while the other converter is normally blocked, dependent upon the desired direction of current flow through the motor armature, a grid voltage impulse former for and connected to the grid of each converter and including at least two inputs thereto, a first such input being varied in accordance with the deviation between the desired and instantaneous values of the armature current to effect a corresponding variation in phase of the grid voltage and variation in the current rectified by the then conductive converter, a second such input being controlled in accordance with a desired reversal in the direction of the armature current to effect a corresponding variation in phase of the grid voltage to change over the then conducting converter from rectifier to full inverter operation feeding back energy into said alternating current supply line, and means controlled in accordance with the instantaneous value of the armature current to block further conduction of the converter then operating as an inverter when said armature current reaches a zero value, said other converter which had up to then been blocked now being rendered conductive to carry the armature current of the reversed direction.

2. A converter plant as defined in claim 1 and which further includes means temporarily reducing the field current of said motor to thereby reduce the armature voltage below the value of the inverter direct voltage preceding a reversal in direction of the armature current.

3. In a converter plant, the combination comprising a pair of converters each having anode, cathode and control grid elements, means reversely connecting the anode-cathode circuits of said converters between an alternating current supply line and a direct current load circuit containing the armature of reversible motor, one of said converters being normally conductive and acting as a rectifier to supply direct current to the motor armature while the other converter is normally blocked, dependent upon the desired direction of current flow through the motor armature, a grid voltage impulse former for and connected to the grid of each converter and including three inputs thereto, one such input being varied in accordance with the deviation between the desired and instantaneous values of the armature current to effect a corresponding variation in phase of the grid voltage and variation in the current rectified by the then conductive converter, a second such input being controlled in accordance with a desired reversal in the direction of armature current to effect a corresponding variation in phase of the grid voltage to change over the then conducting converter from rectifier to full inverter operation feeding back energy into said alternating current supply line, and a third such input being controlled in accordance with the instantaneous value of the armature current to effect a cut-off of the grid voltage impulses from and block further conduction of the converter then operating as an inverter when said armature current reaches a zero value, said other converter which had up to then been blocked now being rendered conductive to carry the armature current of reversed direction.

References Cited by the Examiner
UNITED STATES PATENTS

| | | | |
|---|---|---|---|
| 2,454,206 | 11/48 | Reilly | 318—376 X |
| 2,492,007 | 12/49 | Raymond | 321—16 |
| 2,525,500 | 10/50 | Puchlowski | 318—376 X |
| 2,977,522 | 3/61 | Taft | 318—293 X |

ORIS L. RADER, *Primary Examiner.*

MILTON O. HIRSHFIELD, *Examiner.*